US005830031A

United States Patent [19]

O'Brien et al.

[11] Patent Number: 5,830,031

[45] Date of Patent: Nov. 3, 1998

[54] DOLL HOUSE SWIVEL BASEMENT ADD-ON SYSTEM

[76] Inventors: Cathy G. O'Brien; Carol A. R Gillis, both of 767 Donegal St Peterborough, Ontario, Canada, K9H 4M9

[21] Appl. No.: 821,207

[22] Filed: Mar. 20, 1997

[51] Int. Cl.[6] .......................... A63H 33/42; A63H 3/52; G09B 25/00; G09F 11/02

[52] U.S. Cl. .......................... 446/110; 446/236; 446/476; 434/72; 40/493

[58] Field of Search .......................... 446/82–84, 236, 446/476–478, 110; 434/79, 72; 40/493, 501, 506

[56] References Cited

U.S. PATENT DOCUMENTS

| | | | |
|---|---|---|---|
| D. 156,001 | 11/1949 | Haynes | 446/476 X |
| 214,810 | 4/1879 | Carney | 40/506 |
| 5,482,490 | 1/1996 | Weldon-Ming | 446/478 X |
| 5,580,294 | 12/1996 | Briant | 446/110 |

FOREIGN PATENT DOCUMENTS

| | | | |
|---|---|---|---|
| 381097 | 9/1923 | Germany | 446/476 |
| 103350 | 2/1924 | Switzerland | 446/83 |
| 2069351 | 8/1981 | United Kingdom | 446/476 |

*Primary Examiner*—Robert A. Hafer
*Assistant Examiner*—Laura Fossum

[57] ABSTRACT

A new Doll House Swivel Basement Add-On System for providing a basement in combination with a swivel base for an existing doll house thereby allowing a user to conveniently access all sides of the existing doll house. The inventive device includes a basement structure, a swivel base, a vehicle ramp, a porch, snap-on stairs, and a securing rim. The securing rim is for engaging a bottom portion of the exiting doll house. The swivel base allows the basement structure to rotate along with the existing doll house to allow the user access to all sides of the existing doll house.

8 Claims, 3 Drawing Sheets

DOLL HOUSE SWIVEL BASEMENT ADD-ON SYSTEM

BACKGROUND OF THE INVENTION

1. Field of the Invention

The present invention relates to Doll House Devices and more particularly pertains to a new Doll House Swivel Basement Add-On System for providing a basement in combination with a swivel base for an existing doll house thereby allowing a user to conveniently access all sides of the existing doll house.

2. Description of the Prior Art

The use of Doll House Devices is known in the prior art. More specifically, Doll House Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Doll House Devices include U.S. Pat. Nos. 5,423,709; 5,120,262; 4,883,443; 4,306,371; 4,219,960 and U.S. Design Pat. No. 336,496.

While these devices fulfill their respective, particular objectives and requirements, the aforementioned patents do not disclose a new Doll House Swivel Basement Add-On System. The inventive device includes a basement structure, a swivel base, a vehicle ramp, a porch, snap-on stairs, and a securing rim.

In these respects, the Doll House Swivel Basement Add-On System according to the present invention substantially departs from the conventional concepts and designs of the prior art, and in so doing provides an apparatus primarily developed for the purpose of providing a basement in combination with a swivel base for an existing doll house thereby allowing a user to conveniently access all sides of the existing doll house.

SUMMARY OF THE INVENTION

In view of the foregoing disadvantages inherent in the known types of Doll House Devices now present in the prior art, the present invention provides a new Doll House Swivel Basement Add-On System construction wherein the same can be utilized for providing a basement in combination with a swivel base for an existing doll house thereby allowing a user to conveniently access all sides of the existing doll house.

The general purpose of the present invention, which will be described subsequently in greater detail, is to provide a new Doll House Swivel Basement Add-On System apparatus and method which has many of the advantages of the Doll House Devices mentioned heretofore and many novel features that result in a new Doll House Swivel Basement Add-On System which is not anticipated, rendered obvious, suggested, or even implied by any of the prior art Doll House Devices, either alone or in any combination thereof.

To attain this, the present invention generally comprises a basement structure, a swivel base, a vehicle ramp, a porch, snap-on stairs, and a securing rim.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Doll House Swivel Basement Add-On System apparatus and method which has many of the advantages of the Doll House Devices mentioned heretofore and many novel features that result in a new Doll House Swivel Basement Add-On System which is not anticipated, rendered obvious, suggested, or even implied by any of the prior art Doll House Devices, either alone or in any combination thereof.

It is another object of the present invention to provide a new Doll House Swivel Basement Add-On System which may be easily and efficiently manufactured and marketed.

It is a further object of the present invention to provide a new Doll House Swivel Basement Add-On System which is of a durable and reliable construction.

An even further object of the present invention is to provide a new Doll House Swivel Basement Add-On System which is susceptible of a low cost of manufacture with regard to both materials and labor, and which accordingly is then susceptible of low prices of sale to the consuming public, thereby making such Doll House Swivel Basement Add-On System economically available to the buying public.

Still yet another object of the present invention is to provide a new Doll House Swivel Basement Add-On System which provides in the apparatuses and methods of the prior art some of the advantages thereof, while simultaneously overcoming some of the disadvantages normally associated therewith.

Still another object of the present invention is to provide a new Doll House Swivel Basement Add-On System for providing a basement in combination with a swivel base for an existing doll house thereby allowing a user to conveniently access all sides of the existing doll house.

Yet another object of the present invention is to provide a new Doll House Swivel Basement Add-On System which includes a basement structure, a swivel base, a vehicle ramp, a porch, snap-on stairs, and a securing rim.

Still yet another object of the present invention is to provide a new Doll House Swivel Basement Add-On System that displays the existing doll house in an attractive setting.

Even still another object of the present invention is to provide a new Doll House Swivel Basement Add-On System that provides more accessories to the existing doll house.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
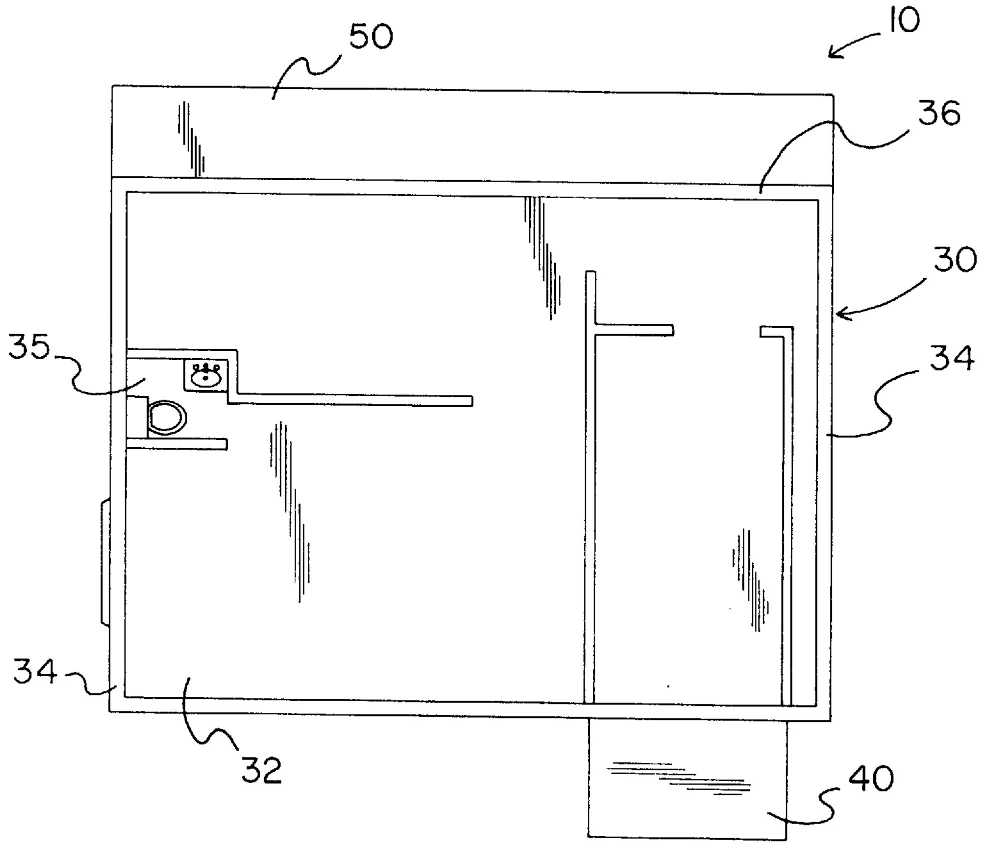
FIG. 1 is a top view of a new Doll House Swivel Basement Add-On System according to the present invention.

With reference now to the drawings, and in particular to FIGS. 1 through 6 thereof, a new Doll House Swivel Basement Add-On System embodying the principles and concepts of the present invention and generally designated by the reference numeral 10 will be described.

More specifically, it will be noted that the Doll House Swivel Basement Add-On System 10 comprises a basement structure 30 and a swivel base 20 rotatably secured to the basement structure 30.

As shown in FIGS. 1 through 6 of the drawings, the basement structure 30 has a floor 32, opposing side walls 34 secured orthogonally to the floor 32 extending upwardly, and a rear wall 36 secured orthogonally to the floor 32 extending upwardly. As best shown in FIG. 1, the rear wall 36 is secured to the opposing side walls 34 thereby forming an unnumbered U-shaped wall structure having a front opening 38 for providing access by a user. The unnumbered U-shaped wall structure has an upper ridge opposite of the floor 32 for engaging and supporting an unnumbered existing doll house. The swivel base 20 rotatably attached to a bottom surface of the floor 32 for allowing manual rotation of the basement structure 30 by the user as best shown in FIGS. 2, 4, 5 and 6 of the drawings. The swivel base 20 has a conical base 22 and a swivel tube 24, wherein the swivel tube 24 has a first end and a second. The first end of the swivel tube 24 engages the conical base 22 and the second end rotatably attaches to the bottom surface of the floor 32.

As best shown in FIGS. 2, 4, 5 and 6, a securing rim 70 is attached to the upper ridge of the unnumbered U-shaped wall structure for snugly engaging a lower portion of the unnumbered existing doll house. The unnumbered U-shaped wall structure is formed to the shape of the lower portion of the unnumbered existing doll house to allow fluid coupling of the present invention with the unnumbered existing doll house.

Figure 2:
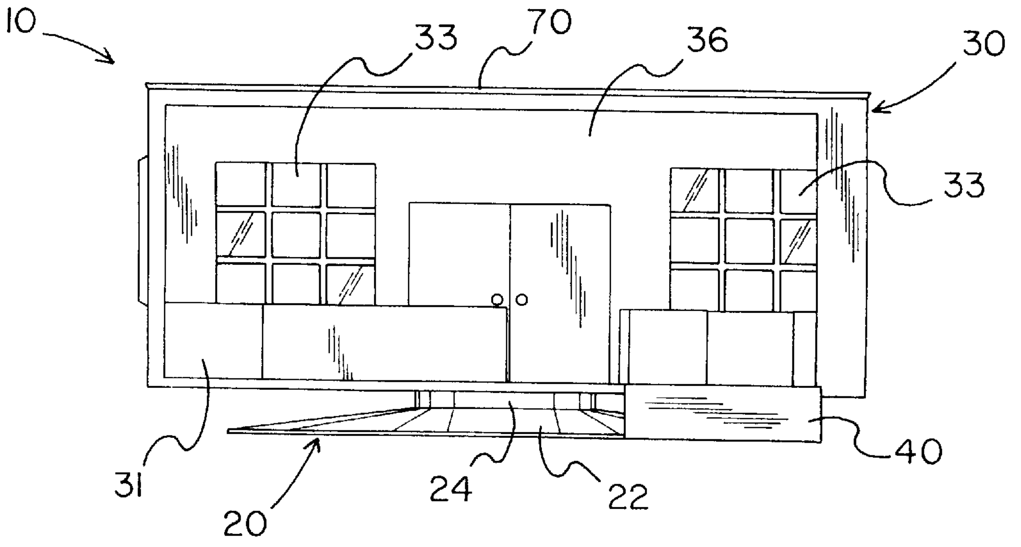
FIG. 2 is a front view of the present invention.
Figure 3:
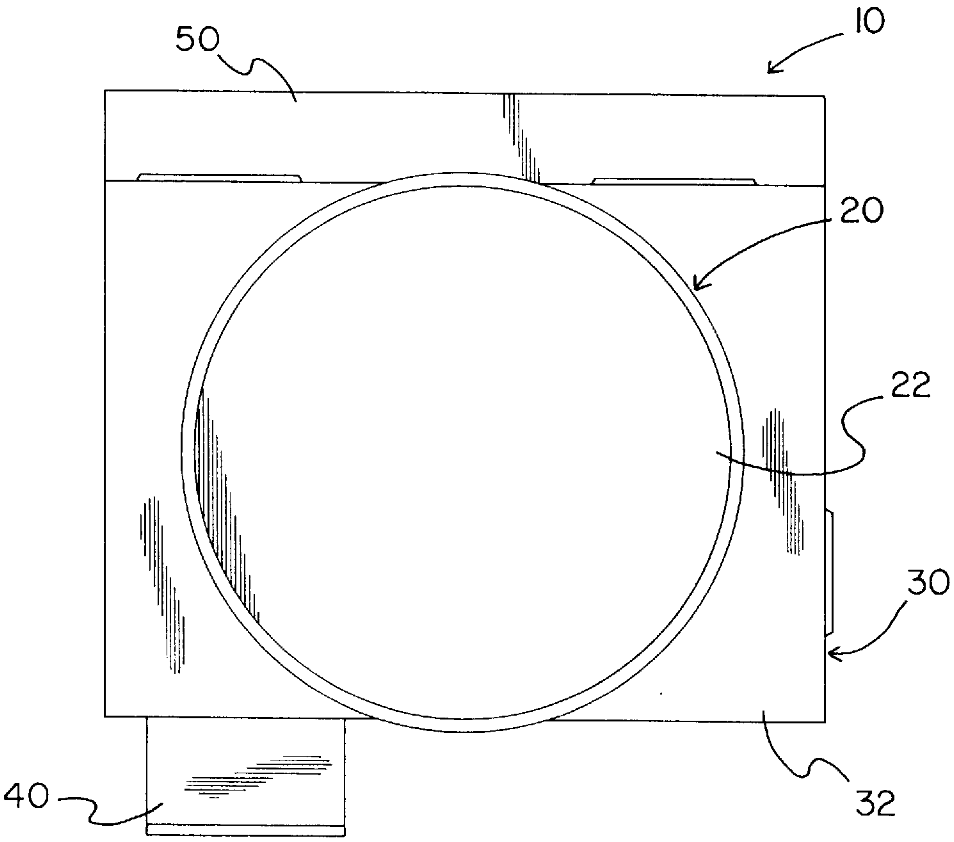
FIG. 3 is a bottom view of the present invention.
Figure 4:
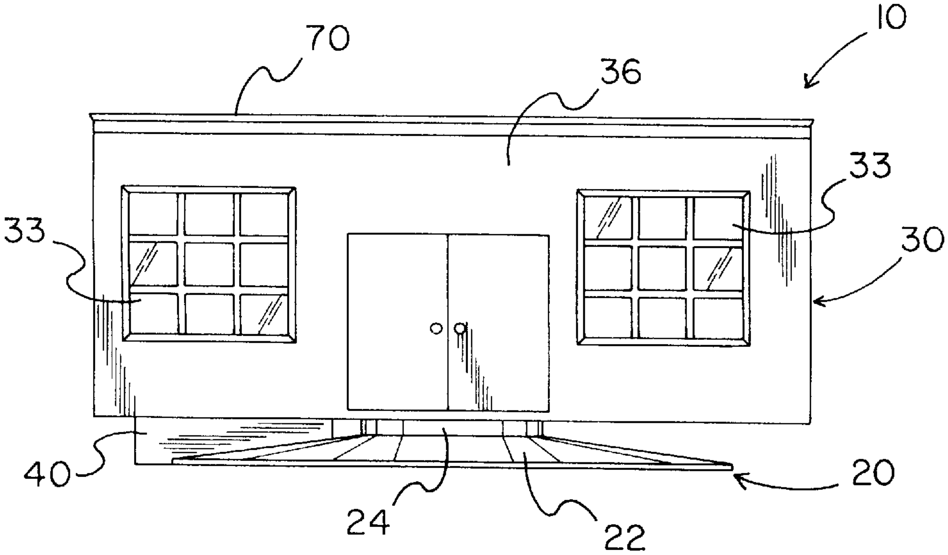
FIG. 4 is a rear view of the present invention.
Figure 5:
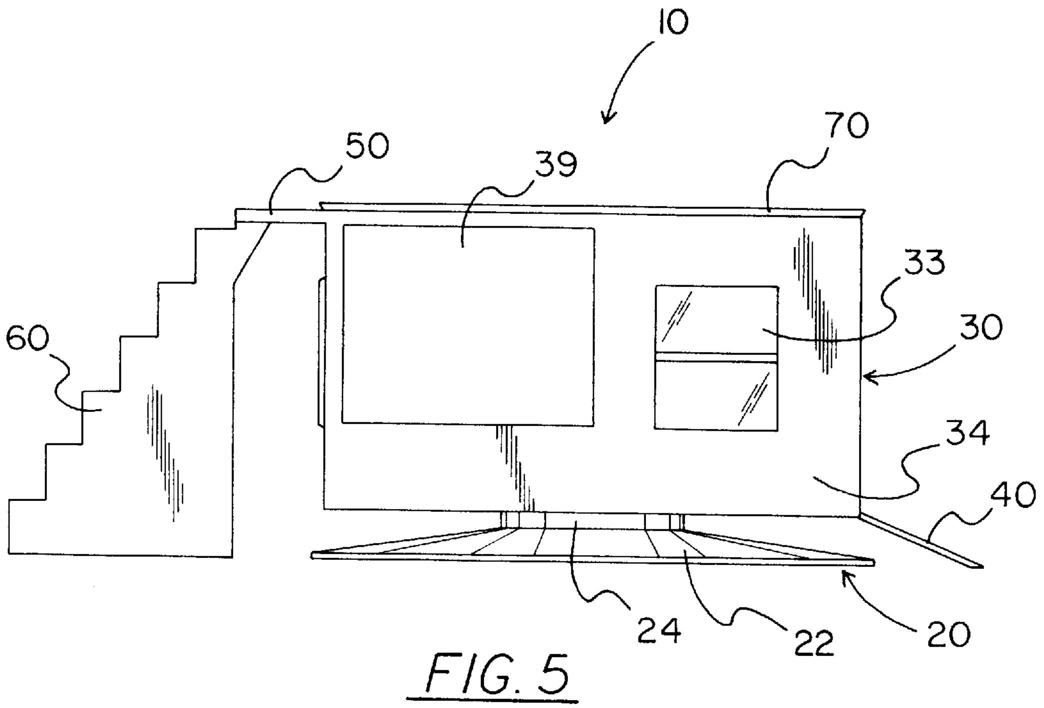
FIG. 5 is a left side view of the present invention.
Figure 6:
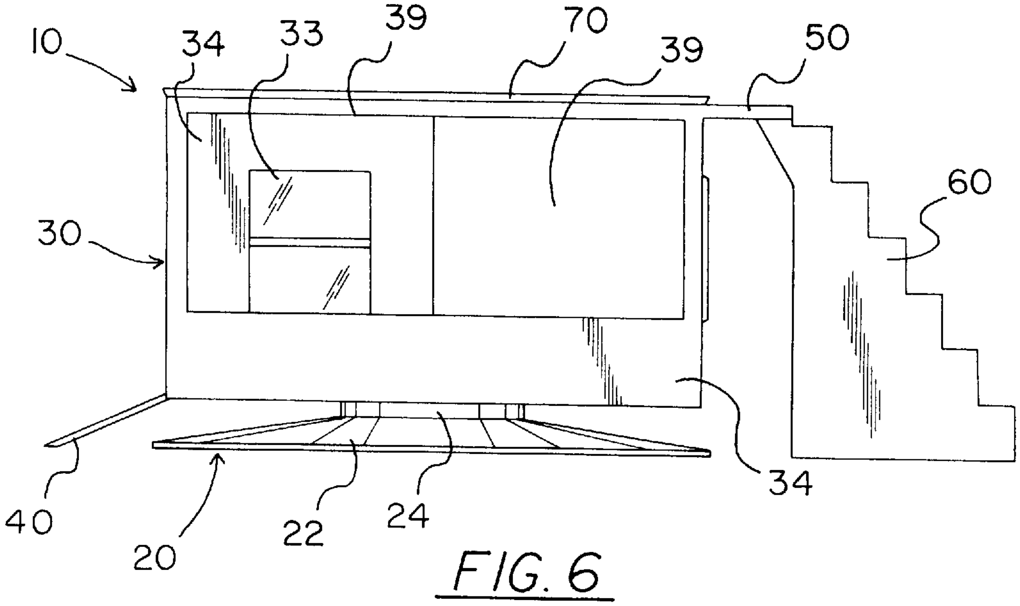
FIG. 6 is a right side view of the present invention.

As shown in FIG. 2 of the drawings, the basement structure 30 includes a partial front wall 31 secured to the floor 32 within the front opening 38 for providing an aesthetic appearance of a room. As shown in FIGS. 2, 4, 5 and 6 of the drawings, there is at least one window 33 secured within the side walls 34. As shown in FIGS. 5 and 6, at least one access opening 39 projects into the side walls 34 or the rear wall 36 for allowing access by the user within an interior portion of the basement structure 30. As shown in FIGS. 1, 3, 5 and 6 of the drawings, the basement structure 30 includes a porch 50 secured to the rear wall 36 near the upper ridge. The porch 50 provides an additional structure for the user to position dolls or other accessories upon. The basement structure 30 preferably has a snap-on stair 60 for removably engaging the porch 50. The snap-on stair 60 allows access to the porch 50 during utilization by the user. The basement structure 30 preferably has a ramp 40 pivotally secured to the floor 32 within the front opening 38 for providing a ramp 40 into the basement structure 30 for a toy automobile as shown in FIGS. 1 through 6 of the drawings. The basement structure 30 preferably has a plurality of rooms, such as a bathroom 35, as best shown in FIG. 1 of the drawings. The plurality of rooms provides the appearance of a conventional basement of a house.

In use, the user removably attaches the unnumbered existing doll house to the basement structure 30 by positioning the lower portion of the unnumbered existing doll house within the securing rim 70 which snugly retains the unnumbered existing doll house. The user may thereafter rotate the basement structure 30 which is coaxial with and securing the unnumbered existing doll house. By rotating the basement structure 30, the user is conveniently able to access all sides of the unnumbered existing doll house and the basement structure 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A doll house swivel basement add-on system for attachment under an existing doll house, the doll house swivel basement add-on system comprising:

a basement structure having a floor, opposing side walls secured orthogonally to said floor and extending upwardly, a rear wall secured orthogonally to said floor and extending upwardly and wherein said rear wall is secured to said opposing side walls to form a U-shaped wall structure positioned around a perimeter of the floor, the wall structure further having a front opening for providing access by a user and wherein said U-shaped wall structure has an upper ridge opposite of said floor for engaging and supporting an existing doll house; and a swivel base rotatably attached to a bottom surface of said floor for allowing manual rotation of said basement structure by said user;

wherein said basement structure includes a porch secured to said rear wall of said basement structure near said upper ridge of said U-shaped wall structure; and wherein said swivel base comprises a conical base and a swivel tube rotatably attaching said conical base to said bottom surface of said floor.

2. The doll house swivel basement add-on system of claim 1, including a securing rim attached to said upper ridge being adapted for snugly engaging a lower portion of the existing doll house.

3. The doll house swivel basement add-on system of claim 2, wherein said basement structure includes:

a partial front wall secured to said floor within said front opening;

at least one window secured within said side walls; and at least one access opening projecting into said side walls or said rear wall for allowing access by said user within an interior portion of said basement structure.

4. A doll house swivel basement add-on system for attachment under an existing doll house, the doll house swivel basement add-on system comprising:

a basement structure having a floor, opposing side walls secured orthogonally to said floor extending upwardly, a rear wall secured orthogonally to said floor extending upwardly and wherein said rear wall is secured to said opposing side walls forming a U-shaped wall structure positioned around a perimeter of the floor, the wall structure further having a front opening for providing access by a user and wherein said U-shaped wall structure has an upper ridge opposite of said floor for engaging and supporting an existing doll house;

a swivel base rotatably attached to a bottom surface of said floor for allowing manual rotation of said basement structure by said user; and a securing rim attached to said upper ridge being adapted for snugly engaging a lower portion of the existing doll house;

wherein said swivel base comprises:

a conical base; and a swivel tube having a first end and a second end, wherein said first end engages said conical base and said second end rotatably attaches to said bottom surface of said floor;

wherein said basement structure includes:

a partial front wall secured to said floor within said front opening;

at least one window secured within said side walls; and at least one access opening projecting into said side walls or said rear wall for allowing access by said user within an interior portion of said basement structure; and wherein said basement structure includes a porch secured to said rear wall near said upper ridge.

5. The doll house swivel basement add-on system of claim 4, wherein said basement structure includes a snap-on stair for removably engaging said porch.

6. The doll house swivel basement add-on system of claim 5, wherein said basement structure includes a ramp pivotally secured to said floor within said front opening for providing a ramp into said basement structure for a toy automobile.

7. The doll house swivel basement add-on system of claim 6, wherein said basement structure includes a plurality of rooms.

8. A doll house swivel basement add-on system for attachment under an existing doll house, the doll house swivel basement add-on system comprising:

a basement structure having a floor, opposing side walls secured orthogonally to said floor extending upwardly, a rear wall secured orthogonally to said floor extending upwardly and wherein said rear wall is secured to said opposing side walls forming a U-shaped wall structure positioned around a perimeter of the floor, the wall structure further having a front opening for providing access by a user and wherein said U-shaped wall structure has an upper ridge opposite of said floor for engaging and supporting an existing doll house;

a swivel base rotatably attached to a bottom surface of said floor for allowing manual rotation of said basement structure by said user;

said swivel base having a conical base;

said swivel base further having a swivel tube having a first end and a second end, wherein said first end engages said conical base and said second end rotatably attaches to said bottom surface of said floor;

a securing rim attached to said upper ridge being adapted for snugly engaging a lower portion of the existing doll house;

a partial front wall secured to said floor within said front opening;

at least one window secured within said side walls;

at least one access opening projecting into said side walls or said rear wall for allowing access by said user within an interior portion of the basement structure;

a porch removably secured to said rear wall;

a snap-on stair for removably engaging said porch;

a ramp pivotally secured to said floor within said front opening for providing a ramp into said basement structure for a toy automobile; and wherein said basement structure includes a plurality of room within the interior portion of the basement structure.

* * * * *